United States Patent [19]
Bennett

[11] Patent Number: 5,209,117
[45] Date of Patent: May 11, 1993

[54] TAPERED CANTILEVER BEAM FOR SENSORS

[75] Inventor: Paul T. Bennett, Phoenix, Ariz.

[73] Assignee: Motorola, Inc., Schaumburg, Ill.

[21] Appl. No.: 600,949

[22] Filed: Oct. 22, 1990

[51] Int. Cl.⁵ .......................................... G01P 15/125
[52] U.S. Cl. ................................ 73/517 R; 73/517 B; 361/280; 324/658
[58] Field of Search .............. 73/517 R, 517 B, 517 R, 73/517 B, 516 R; 361/280, 283; 324/658

[56] References Cited

U.S. PATENT DOCUMENTS

| | | | |
|---|---|---|---|
| 2,322,681 | 6/1943 | Zenor | 73/517 R |
| 4,660,418 | 4/1987 | Greenwood et al. | 73/517 R |
| 4,676,104 | 6/1987 | Cullen | 73/517 R |
| 4,891,985 | 1/1990 | Glenn | 73/517 R |
| 4,922,756 | 5/1990 | Henrion | 73/517 B |
| 4,987,781 | 1/1991 | Reimann | 73/517 R |
| 5,081,867 | 2/1992 | Yamada | 73/517 R |
| 5,095,752 | 3/1992 | Suzuki et al. | 73/517 R |

Primary Examiner—Hezron E. Williams
Assistant Examiner—George M. Dombroske
Attorney, Agent, or Firm—Eugene A. Parsons

[57] ABSTRACT

A method of making a sensor with a mass (14) that is supported by at least one tapered cantilever beam (11). Tapered cantilever beam or beams (11) can be used in either capacitive or piezo-resistive structure. Increased sensitivity and decreased fragility is obtained by using the tapered cantilever beam.

9 Claims, 2 Drawing Sheets

TAPERED CANTILEVER BEAM FOR SENSORS

BACKGROUND OF THE INVENTION

This invention relates, in general, to making solid-state sensors, and more specifically to making micromachined cantilever beams for sensors.

Cantilever beam structures have been generally used in electronic sensors to detect movement. Movement of the sensor causes the cantilever beam to bend. Two methods that have been commonly used to detect bending of micromachined structures are piezo-resistive and capacitive structures. The piezo-resistive method uses a resistor network which changes resistance as the structure bends. The capacitive method uses a fixed plate mounted in parallel with and in close proximity to a moving plate. As the moving plate bends, and gets closer or farther away from the fixed plate, a change in capacitance occurs.

Conventional cantilever piezo-resistive and capacitive devices however, have several problems such as, fragility, poor deflection or movement of the beam, and long term reliability.

Commonly designed cantilever beams are very sensitive to extreme and sudden movements or the like. Damage occurs to the cantilever beam when movement occurs that is outside the operating range of the device. Once the damage occurs the device is useless.

Poor deflection or movement of the cantilever beam in response to movement has also been a problem in conventionally designed structures. The poor deflection of the cantilever beam structure is due to stiffness or rigidity of the conventional designs for cantilever beams. Accordingly, it would be desirable to provide a sensor structure that has cantilever beams which overcome the aforesaid problems.

SUMMARY OF THE INVENTION

The objects and advantages of the present invention are provided by a method of making a sensor with a mass that is supported by a tapered cantilever beam. The tapered beam is used both in piezo-resistive and capacitive type structures such as accelerometers.

DETAILED DESCRIPTION OF THE DRAWINGS

Figure 1:
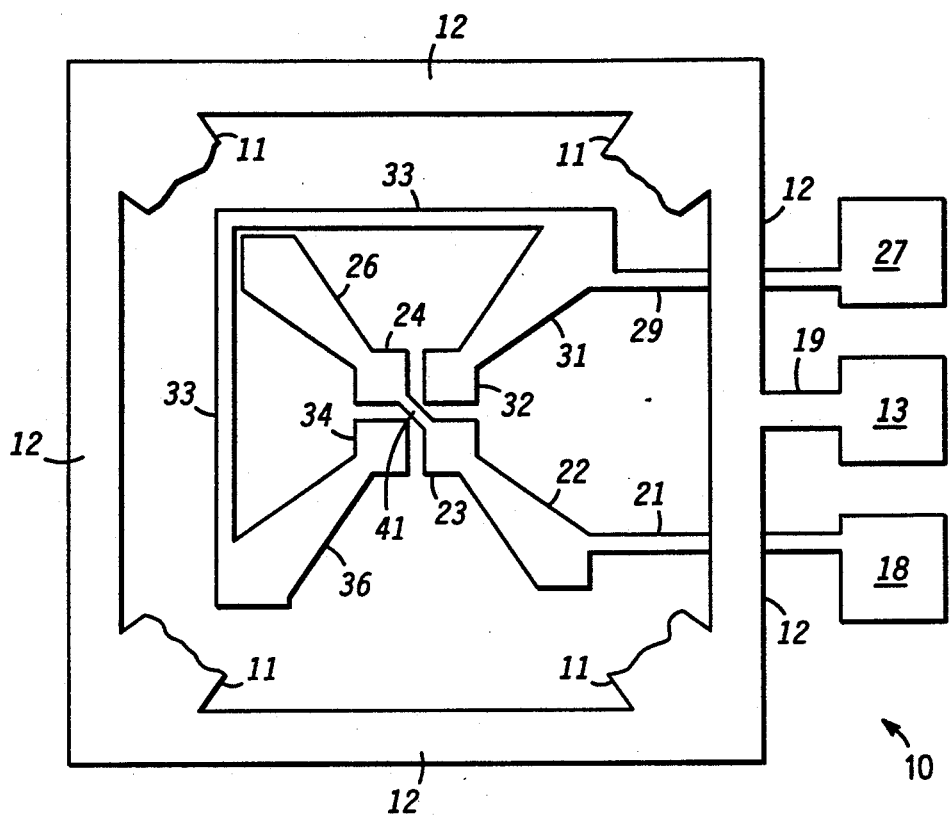
FIG. 1 is an enlarged top cut away view of a tapered cantilever accelerometer.

FIG. 1 is an enlarged top cut away view of a tapered cantilever accelerometer 10. Tapered cantilever arms 11 (partially shown) and seismic mass 14 (not shown) have been removed to expose underlying parts of a fixed capacitor plate. Generally, capacitive accelerometers function so that there is a change in capacitance in response to forces caused by acceleration. By way of example, one method of processing used to fabricate cantilever beam structures is disclosed by P. M. Sarro and A. W. van Herwaarden, "Silicon Cantilever Beams Fabricated by Electrochemically Controlled Etching for Sensor Applications," Journal Electrochemical Society: Solid-State Science and Technology, August 1986, pages 1724-1729 and is hereby incorporated herein by reference. Capacitive accelerometers are commonly made with at least one fixed capacitive plate and with at least one capacitive plate that is movable. Due to acceleration the movable capacitor plate either moves closer to or farther away from a fixed capacitor plate thereby causing a change in capacitance.

Bonding pads 18 and 27 are connected to two approximately equal but separate halves of a fixed capacitor plate structure. It should be understood that the two halves of fixed capacitor plate could be coalesced into one fixed capacitor plate; however, in most accelerometer applications it is preferred to have separate capacitor halves. The capacitor halves are electrically conductive patterns preferably made on a semiconductor substrate. One half of fixed capacitor plate and associated structures includes bonding pad 27, connecting lines 29 and 33, fixed capacitor plate extensions 31 and 36, and fixed capacitor plates 34 and 32. Bonding pad 27 is connected to fixed capacitor plate extension 31 by conductive line 29. Part of conductive line 29 can not be seen because ring structure 12 crosses over top of conductive line 29. Fixed capacitive plate extension 31 is connected to fixed capacitive plate 32 and conductive line 33. Connection between fixed capacitor plate extension 31 and fixed capacitor plate extension plate 36 is accomplished by conductive line 33. Fixed capacitor plate extension 36 is connected to fixed capacitor plate 34. The other half of fixed capacitor plate includes bonding pad 18, connecting line 21, fixed capacitor plate extensions 22 and 26, and fixed capacitor plates 23 and 24. Bonding pad 18 is connected to fixed capacitor plate extension 22 by conductive line 21. Part of conductive line 21 can not be seen because ring 12 crosses over top of conductive line 21. Fixed capacitor plate extension 22 is connected to fixed capacitive plate 23. Connection between fixed capacitor plates 23 and 24 is accomplished by interconnection 41. Fixed capacitor plate 24 is then connected to fixed capacitor plate extension 26.

Fixed capacitor plates 24, 23, 32 and 34 sense a majority of the change in capacitance in sensor 10 from movement of seismic mass 14 (not shown). By separating fixed capacitor plate structure into two halves, a method is provided to electrically test the movement of seismic mass 14 (not shown). Charging on half of the fixed capacitor plate either positively or negatively and having a similar or dissimilar charge on seismic mass 14 (not shown) a movement in seismic mass is achieved which is measured by a change in capacitance measured by the uncharged half of the fixed capacitor plate.

Fixed capacitive plate extensions 36, 31, 22, and 26 have a tapered configuration and sense additional capacitive changes from movement of tapered cantilevers beams 11 (partially shown). Sensing movement from tapered cantilever beams 11 increases sensitivity and signal output of accelerometer 10.

Bonding pad 13 is connected to ring structure 12 by conductive line 19. Ring structure 12 supports tapered cantilever beams 11. Cantilever beams 11 extend from all four corners of ring structure 12 toward a central location where they connect to seismic mass 14 (not shown).

Figure 2:
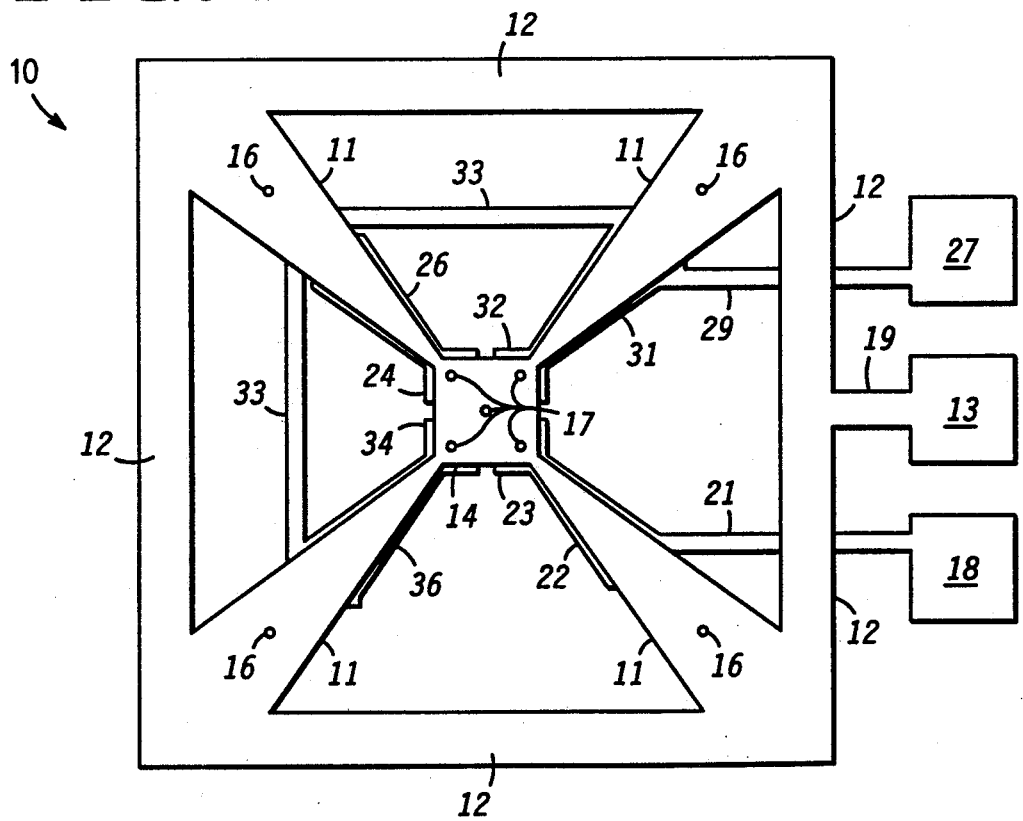
FIG. 2 is an enlarged top view of the accelerometer of FIG. 1, showing the tapered cantilever supports.

FIG. 2 is an enlarged top view of a tapered cantilever accelerometer 10. FIG. 2 is the same as FIG. 1 except that portions of the fixed capacitor plates are now covered by tapered cantilever beams 11 and seismic mass 14. Seismic mass 14 is suspended over the fixed capacitor plates and is supported in suspension by tapered cantilever beams 11 wherein the narrower end of beams 11 are attached to mass 14.

Conventional cantilever beams are rectangular in shape. Rectangular cantilever beams display inferior performance to tapered cantilever beams. Tapered cantilever beams 11 provide a design which is capable of absorbing a significantly greater amount of elastic energy than rectangular cantilever beams of the same volume with a constant rectangular cross section. Tapered cantilever beams 11 allow for a greater deflection of seismic mass or moveable capacitor plate 14 in response to movement, vibration, acceleration, or the like. Additionally, lower stress and strain values are obtained which yields a less fragile and more durable device. It should be understood that these advantages can be applied to a single cantilever beam as well. It should be further understood that both piezo-resistive and capacitive sensors yield advantages by using a tapered cantilever design.

Seismic mass 14 is positioned over all four fixed capacitor plates 24, 32, 34, and 23. Openings 17 can be formed in the seismic mass 14 to provide dampening of motion of seismic mass in response to acceleration, vibration, or the like. By damping the motion of seismic mass 14 uncontrolled oscillatory motion is reduced. Openings 16 and 17 also provide an additional path for etching away material under seismic mass 14. Additionally, openings 16 are located on tapered cantilever arms 11.

Figure 3:
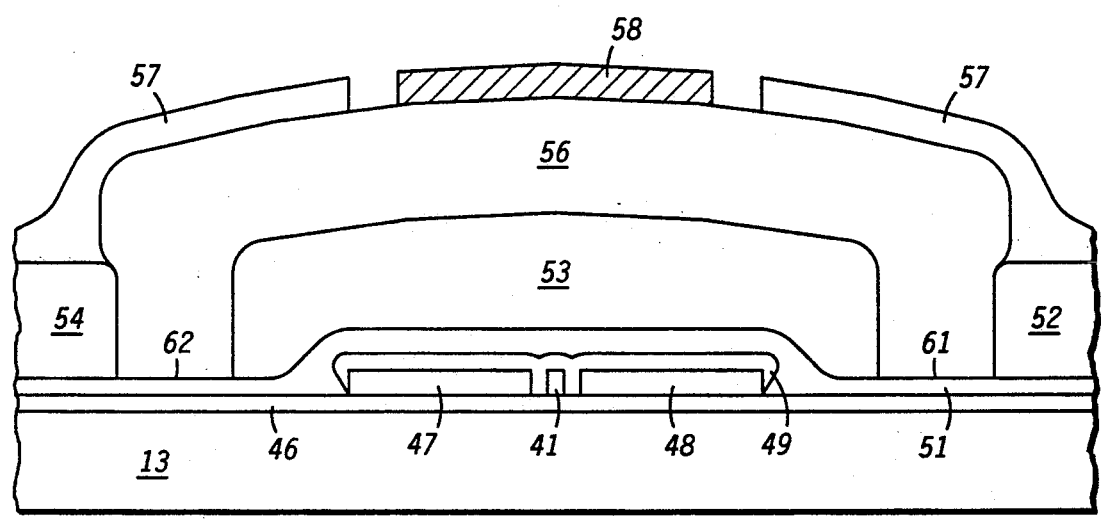
FIG. 3 is an enlarged cross-section of the accelerometer of FIG. 2.

FIG. 3 is an enlarged cross-section of a tapered cantilever accelerometer. The cross-section was taken from the upper right hand corner of ring structure 12 to the lower left hand corner of ring structure 12. It should be understood that by cross-sectioning accelerometer 10 not all features can be observed. Openings 16 and 17 that go through layers 56 and 58 are not shown in FIG. 3 so as to provide greater clarity. Deposition, doping of materials, oxidation, photolithography, and etching are all well known techniques used in the semiconductor art. It is not the purpose of this specification to delve deeply into these known techniques. It should however be further understood that these known techniques are used to produce this invention.

Semiconductor substrate 13 is generally made of silicon or the like. A first blanket layer of silicon nitride 46 is deposited to a thickness of approximately 1500 angstroms on substrate 13. A first blanket layer of polysilicon is deposited to a thickness of approximately 4000 angstroms on silicon nitride layer 46. The first blanket layer of polysilicon is then doped with a suitable dopant such as phosphine or the like. Fixed capacitor plates 23, 24, 32 and 34, fixed capacitor plate extensions 31, 36, 22 and 26, conductive lines 21, 29, 33, and 41, and bonding pads 27 and 18 are defined and etched. Polysilicon structure 47 is a cross-section of fixed capacitor plate extension 36 and fixed capacitor plate 34. Structure 41 is a cross-section of the interconnection between fixed capacitor plate 23 and 24. Structure 48 is a cross-section of fixed capacitor plate extension 31 and fixed capacitor plate 32.

Polysilicon structures are then oxidized resulting in a silicon dioxide layer on polysilicon structures shown by layer 49. Oxidation of silicon nitride layer 46 is very difficult therefore, most of the oxidation occurs to the polysilicon structures. A second blanket layer of silicon nitride layer 51 is deposited to a thickness of approximately 1500 angstroms over silicon dioxide layer 49 and silicon nitride layer 46. A first blanket layer of silicon dioxide is deposited to a thickness of approximately 20,000 angstroms on silicon nitride layer 51. Openings are defined and etched into the blanket layer of silicon dioxide. These openings correspond to ring structure 12, conductive line 19, and bonding pad 13. After etching openings islands of silicon dioxide are formed that are shown as silicon dioxide structures 53, 52 and 54.

A blanket layer of polysilicon is deposited to a thickness of approximately 20,000 angstroms over oxide islands 52, 53, and 54, as well as, into the openings previously defined. This blanket polysilicon layer is defined and etched to form bonding pad 13, conductive line 19, ring structure 12, cantilever beams 11, and seismic mass 14. Layer 56 is a cross-section of seismic mass 14, two tapered cantilever beams 11 on each side, and two corners 61 and 62 that support cantilever beams 11. As illustrated in FIG. 3, cantilever beams 11 originate at ends or corners 61 and 62 and extend upwards from corners 61 and 62 toward suspended mass 56. Additionally, as illustrated in FIG. 2, cantilever beams 11 continuously taper from both corners 61 and 62 to seismic mass 14. It should be understood that openings 16 in cantilever 11 and openings 17 in seismic mass 14 can be defined and etched at the same time as the rest of the polysilicon structures are being defined and etched.

A first layer of doped silicon dioxide 57 is deposited to a thickness of approximately 10,000 angstroms over polysilicon structure 56, and silicon dioxide areas 52 and 54. Doped silicon dioxide layer 57 is used, in this example, to autodope defined polysilicon structures 56 and the like during an anneal cycle. It should be understood that other methods such as ion implantation, diffusion, or the like could also be used to dope polysilicon layer 56. It should be further understood that once the polysilicon structures are suitably doped, removal of silicon dioxide layer 57 and silicon dioxide islands 52, 53, and 54 yields a moveable capacitor plate which results in a functioning sensor 10. Completed sensor is acceptable for some applications that do not require great sensitivity.

Greater sensitivity is obtained by adding a mass 58 to the seismic mass region of layer 56. By way of example, a rectangular opening is cut in silicon dioxide layer 57. A dense material or metal layer is deposited to a thickness of approximately 10,000 angstroms. The metal layer is then defined and etched forming a rectangular metal structure 58. Removal of silicon dioxide layer 57 and silicon dioxide islands 52, 53, and 54 is now done which yields a functioning sensor 10 with greater sensitivity.

By now, it should be appreciated that there has been provided a novel method of making sensors. Use of a tapered cantilever beam or beams provide greater sensitivity and a more durable sensor.

What is claimed is:

1. A sensor which comprises:
   a substrate;
   a first electrically conductive area supported by the substrate which is part of a capacitor;
   a suspended mass which is electrically conductive but, is suspended above and is isolated from the first electrically conductive area; and
   a tapered support means including a cantilever beam having a first end and a second end with the second end attached to the substrate and extending upwards from the substrate, wherein the cantilever beam is further extended from the upward extension of the second end toward the suspended mass, and is continuously tapered with the first end being narrower than the second end, the first end being attached to the suspended mass, and wherein the suspended mass serves as part of a capacitor that moves.

2. The sensor of claim 1 wherein the suspended mass is supported by a plurality of tapered support means.

3. The sensor of claim 1 wherein the mass is rectangular shaped and is supported at each of its corners.

4. The sensor of claim 1 wherein additional material is added to the suspended mass to increase sensitivity.

5. The sensor of claim 1 wherein the first electrical conductive area is divided into two separate halves.

6. A sensor as claimed in claim 1 wherein the first conductive area further comprises:
a fixed capacitor plate extension having a first end and a second end, the first end attached to the first electrically conductive area, wherein the first end of the fixed capacitor plate extension is narrower than the second end of the fixed capacitor plate extension such that a continuous taper is formed between the first end and the second end of the fixed capacitor plate extension, thereby sensing capacitive changes in the fixed capacitive plate extension from movement of the cantilever beam.

7. A sensor as claimed in claim 1 further comprising:
a dielectric layer formed on the substrate before the electrically conductive area is formed, wherein the dielectric layer serves to electrically insulate the first electrically conductive area from the substrate.

8. A sensor which comprises:
a substrate;
a first electrically conductive area supported by the substrate which is part of a capacitor;
a suspended mass which is electrically conductive but, is suspended above and is isolated from the first electrically conductive area; and
a tapered support means including a cantilever beam having a first end, a second end, a first side, and a second side with the second end attached to the substrate and extending upwards from the substrate, wherein the cantilever beam is further extended from the upward extension of the second end toward the suspended mass, and the first and second sides are continuously tapered with the sides of the first end being narrower than the sides of the second end, the first end being attached to the suspended mass, and wherein the suspended mass serves as part of a capacitor that moves.

9. A sensor which comprises:
a substrate;
a first electrically conductive area supported by the substrate which is part of a capacitor;
a suspended mass which is electrically conductive but, is suspended above and is isolated from the first electrically conductive area; and
a plurality of cantilever beams, each cantilever beam having a first end and a second end with the second end attached to the substrate and extending upwards from the substrate located diagonally across from each other, wherein each cantilever beam is further extended from the upward extension of the second end toward the suspended mass, and is continuously tapered with the first end being narrower than the second end, the first end being attached to the suspended mass, and wherein the suspended mass serves as a part of a capacitor that moves, the tapered support means having its narrower end attached to the suspended mass.

* * * * *